United States Patent Office.

ISAAC REHN, OF PHILADELPHIA, PENNSYLVANIA.

*Letters Patent No.* 76,660, *dated April* 14, 1868; *reissue No.* 2,952, *dated May* 26, 1868.

MODE OF PRINTING PHOTOGRAPHIC PICTURES.

The Schedule referred to in these Letters Patent and making part of the same.

Be it known that I, ISAAC REHN, of the city and county of Philadelphia, and State of Pennsylvania, have invented a new and improved Mode of Photographic Printing on Non-Absorbent as well as Absorbent Materials; and I do hereby declare the following to be a full and exact description of the same.

The object of my invention is to enable any person of ordinary skill so to prepare the surface of painted canvas, boards, signs, iron plates, or other substances, that photographic printing on the same, both by contact or by the solar camera, for coloring, or to be preserved plain, may be successfully performed.

The mode usually employed for producing pictures for coloring is to make the print on paper, and then paste the same on canvas or mill-board, though attempts, with partial success, have been made to print on canvas, but the methods were complicated, the results imperfect, and the processes uncertain, besides which, the canvas is more or less injured by the action of the chemicals. By the method I employ, and am about to describe, the resulting picture is clear and strong, easily and surely made, while the surface of the material is left uninjured.

I proceed as follows: Take, of zinc-white, white lead, magnesia, or other suitable pigmentary substance not chemically incompatible with the sensitiveness of the compound, and which will give sufficient body, one ounce; albumen, (or both the albumen and the yolk may be successfully employed,) one and a half ounce; salt, or other soluble chloride, twenty grains; solution of ammonio-nitrate of silver, four drachms, containing thirty grains of nitrate of silver to each drachm. Dissolve the salt in the albumen, then grind fine, on a painter's slab, the pigmentary substance in a portion of the albumen; then add the remainder of the albumen, and mix thoroughly; place the mixture in a Wedgewood mortar, and proceed to a dark room; then add the silver-solution, which will immediately coagulate the albumen, and with the pestle triturate the coagulated mixture until it is perfectly smooth and homogeneous. It is then ready to apply. Now, take a flat brush of fine hair, and paint evenly over the surface the substance to be photographed upon. If contact-printing is intended, the coating must be left to dry, but if for the solar camera it may be used while it is yet wet. After the printing is completed, the pictures are fixed in the usual way with hyposulphite of soda, and washed.

This film, when it becomes dry, is very firm, and the surface is ready for coloring in either water or oil-colors; or, if the printing is carefully done, the results are as fine as those by the best methods in use on paper.

For solar-camera work, I prefer zinc-white for the pigment, as it makes a very sensitive compound; but where the time is of little importance, as in contact-printing, white lead gives great strength in the whites. Magnesia furnishes a reddish print, and has some advantages where deep blacks are an objection. Other substances, such as kaolin, give varying results and adaptations.

In solar-camera printing, sensitiveness is a very important requisite, and this may be further increased by subjecting the coating to the vapors of ammonia.

The above coating or sensitive paint has the quality of taking very kindly to oily surfaces, and may be very easily spread without imperfections of any kind. I have sometimes painted the canvas with the uncoagulated mixture, and, after the same was dry, flowed the silver-solution over; but it is difficult to get a uniform action in this way, and is, moreover, far more troublesome and expensive.

My mode of preparing the ammonio-nitrate of silver solution for this use is as follows:

Take, of nitrate of silver, one ounce; dissolve this in an equal weight of water; remove a small portion of the solution to another vessel; add strong ammonia to the larger portion until all the silver has been precipitated and redissolved; then add the balance of the silver-solution, to insure an excess of silver; to this add half an ounce of pure nitric acid. When this is done, if the whole does not measure two fluid ounces, add water to make that amount.

The advantages of my process are, the increased sensitiveness for solar-camera printing; the ease and certainty in producing good results; its applicability to all kinds of material on which it may be desirable to print, and its greater economy, there being no waste of materials, either as drippings or excesses, or of the canvas, board, or other matter employed, for, in case of a failure by accident, the sensitive coating may be scrubbed off and a new one applied, with no injury.

Having described my invention, I claim—

The combination of the silver, the albumen, and the salt, with a pigmentary substance, to give increased sensitiveness and consistency to the photographic compound, substantially as described.

ISAAC REHN.

Witnesses:

D. SHEPHERD HOLMAN,

NAP'N B. MANNING.